United States Patent [19]

Klomp

[11] 3,878,825

[45] Apr. 22, 1975

[54] SWIRL INDUCING POPPET VALVE

[75] Inventor: Edward D. Klomp, Mt. Clemens, Mich.

[73] Assignee: General Motors Corporation, Detroit, Mich.

[22] Filed: Sept. 28, 1973

[21] Appl. No.: 401,646

[52] U.S. Cl.. 123/188 M; 123/188 A; 123/188 AA; 123/188 S; 251/322; 251/323
[51] Int. Cl. ............................................... F22b 5/00
[58] Field of Search ........ 123/188 S, 188 M, 188 A, 123/188 AA, 188 AP; 251/321

[56] References Cited
UNITED STATES PATENTS

| | | | |
|---|---|---|---|
| 1,988,018 | 1/1935 | Peterson | 123/188 AP |
| 2,920,613 | 1/1960 | Vogel | 123/188 M |
| 2,921,571 | 1/1960 | Vogel | 123/188 M |

OTHER PUBLICATIONS
Valve Mechanisms for High Speed Engines, Philip H. Smith, 1971, pp. 216–220 and Photos 32 and 33.

Primary Examiner—Manuel A. Antonakas
Assistant Examiner—Daniel J. O'Connor
Attorney, Agent, or Firm—Arthur N. Krein

[57] ABSTRACT

A poppet valve for use as an intake valve in a reciprocating internal combustion engine, the poppet valve having its stem skewed at an angle relative to the axis of the valve head thereof so that as the stem is reciprocated axially, the valve head will move simultaneously in both a vertical and horizontal direction relative to the valve seat of an inlet port to a combustion chamber of the engine with which this valve cooperates, the valve thus providing more flow area on one side of the inlet port than on the other side to effect swirling motion of the iuduction fluid as it flows into the combustion chamber.

4 Claims, 3 Drawing Figures

PATENTED APR 22 1975   3,878,825
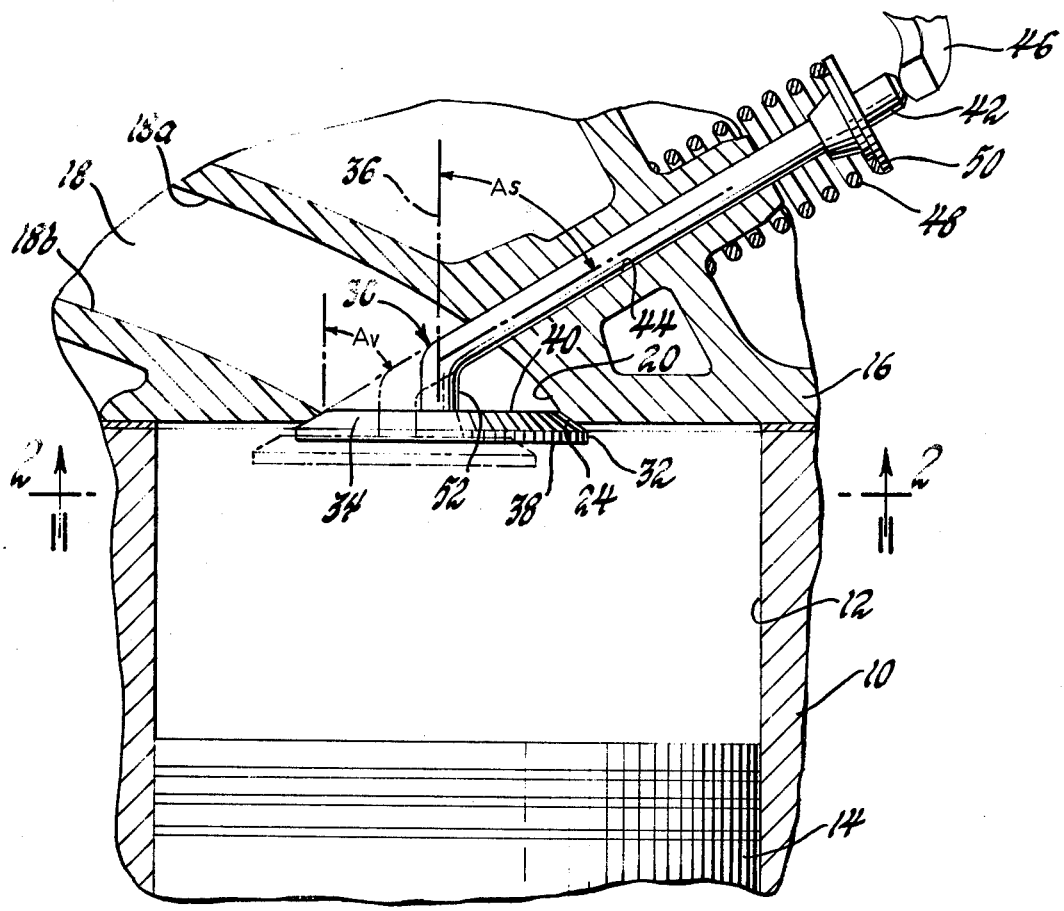
Fig. 1
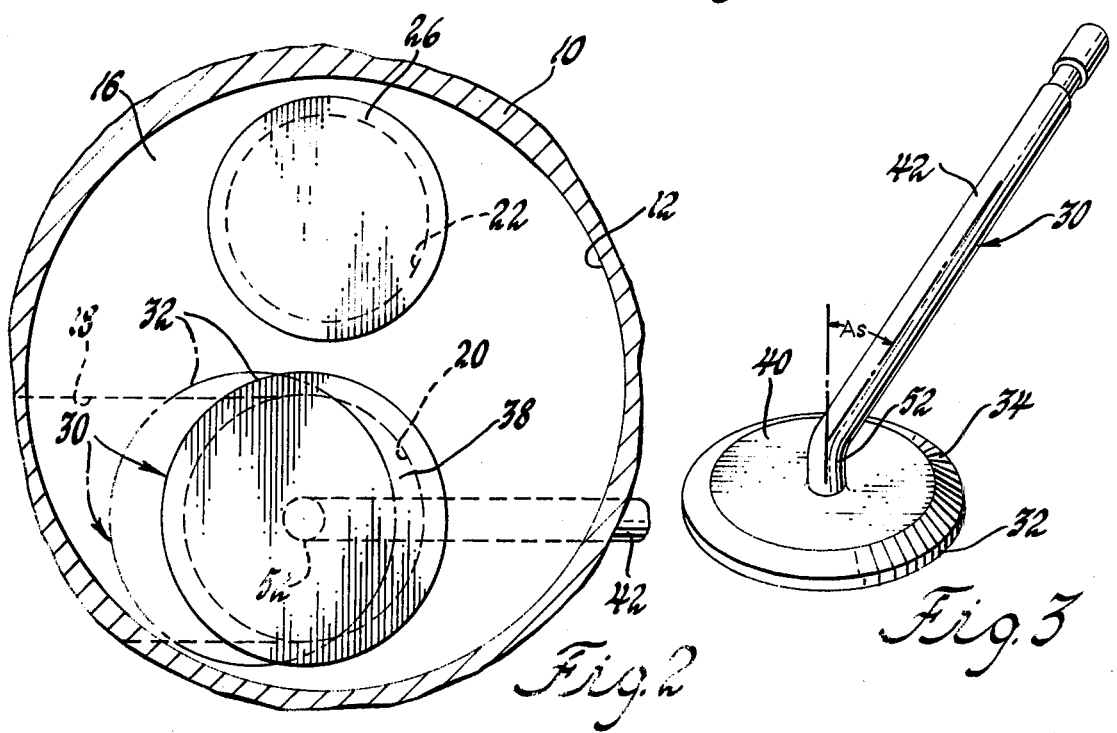
Fig. 2
Fig. 3

SWIRL INDUCING POPPET VALVE

This invention relates to valves for reciprocating engines and the like and, in particular, to an intake poppet valve structure by which swirl is introduced into the combustion chamber of a reciprocating engine during actuation of the poppet valve.

Intake or induction valves for internal combustion engines are normally of the poppet valve type, having an annular head adapted to seat against a valve seat in the cylinder head of the engine to control the flow of induction fluid from the intake manifold to a cylinder of the engine during the induction cycle for that cylinder of the engine. Such a poppet valve is provided with a stem extending from the head of the valve and concentric with the head, this stem being reciprocably journalled in the cylinder head with one end of the stem extending from the cylinder head for engagement by suitable means, such as a rocker arm to effect reciprocating movement of the valve in a direction in line with the common axis of the stem and head of the poppet valve. The head of such a poppet valve is provided with an annular seating portion adapted to seat against an annular bevelled valve seat provided in the inlet or intake port in the cylinder head for this purpose.

In such a conventional poppet valve, when the head is unseated from the valve seat, a uniform annular flow area is provided between the valve head and the inlet port for the flow of induction fluid into the cylinder or combustion chamber of the engine. With such an arrangement, induction fluid flow is substantially uniform around the head of the valve and, accordingly, depending on the location of the inlet port relative to the longitudinal axis of the cylinder, there is little or no swirling motion of the induction fluid entering the cylinder around the longitudinal axis of the cylinder.

Because of this, various means have been used in the prior art to promote swirl of the induction fluid on entry into the combustion chamber, such as by the use of a shrouded valve or a swirl port. For example, by providing the outer surface of the valve guide in the inlet port with suitable shaped ribs or veins, induction fluid entering the cylinder from this port is given a direction of flow which, in general, is in the desired direction of induction fluid flow rotation around the axis of the cylinder. However, it has been found that whether a shrouded valve or a swirl port is used to introduce swirl, the use of such a swirl inducing device will effect a reduction in the volumetric efficiency of the engine.

Furthermore, the use of either a shrouded valve or a swirl port is not readily adaptable for use in a split manifold type engine. This may be due to the fact that the suitably shaped ribs or veins reduce the flow coefficient in the flow passing through the inlet port and around the poppet valve.

Accordingly, the principal object of this invention is to provide a poppet type, intake valve whereby swirl may be introduced into the combustion chamber of the engine when the intake valve is actuated while permitting unrestricted flow to the combustion chamber.

Another object of this invention is to provide an intake valve structure for use in an internal combustion engine by which swirl may be introduced into the combustion chamber while at the same time providing a flow passage around the valve having a high flow coefficient.

A further object of this invention is to provide a poppet valve having a configuration such that when the stem thereof is reciprocated in a straight line motion, the valve head will have both vertical and horizontal components of motion relative to the valve seat in the inlet port to the cylinder of an engine.

These and other objects of the invention are obtained by a poppet valve structure in which the stem of the poppet valve is skewed at an angle to the axis of the head of the poppet valve, that is, the stem is positioned at an angle less than 90° from the normal plane of the valve face, so that the valve motion upon reciprocable actuation of the stem thereof will cause the valve head to move both vertically and horizontally, simultaneously, relative to the valve seat defining an intake port.

For a better understanding of the invention, as well as other objects and further features thereof, reference is had to the following detailed description of the invention to be read in connection with the accompanying drawings, wherein:

FIG. 1 is a sectional view of a portion of an internal combustion engine having an intake valve, constructed in accordance with the invention, positioned to control the flow of induction fluid to the combustion chamber of the engine;

FIG. 2 is a sectional view taken on line 2—2 of FIG. 1; and,

FIG. 3 is a perspective view of a skewed stem poppet valve in accordance with the invention.

Referring now to FIGS. 1 and 2, there is illustrated a portion of an internal combustion engine having an engine cylinder block 10 with a cylinder bore 12 therein reciprocably receiving a piston 14 to define a combustion chamber, the cylinder bore being partly closed at one end by a cylinder head 16 secured to the engine cylinder block. The cylinder head 16 is provided with an induction passage 18 and an exhaust passage, not shown, terminating respectively at an intake or inlet port 20 and an exhaust port 22, the latter only being seen in FIG. 2. Inlet port 20 presents an annular valve seat 24 which, as is well known, is chamfered or bevelled at a suitable angle to the axis of the inlet port, as desired. Induction passage 18, as is well known, is curved in its longitudinal direction at least adjacent to the inlet port end thereof to change the direction of induction fluid flow therethrough, the induction passage 18 thus having an outside bend 18a and an inside bend 18b, as seen in FIG. 1.

Flow through inlet port 20 is regulated by a poppet valve 30 having a head 32 with a bevelled seating surface 34 thereon formed complementary to the valve seat 24. Flow through exhaust port 22 is also regulated by the head 26 of an exhaust valve cooperating with a valve seat, not shown, in the exhaust port.

As best seen in FIGS. 1 and 3, the head 32 of poppet valve 30 is formed as a body of revolution about an axis 36 with a valve face 38 on one side thereof, which in the embodiment illustrated is flat, and a valve back 40 on its other side. The outer peripheral rim of the valve head 32 is provided with the annular bevelled seating portion 34 adapted to seat against the valve seat 24 in the annular inlet port 20 of cylinder head 16, the axis of valve head 32 when thus seated being coaxial with the axis of inlet port 20. The seating portion 34 of valve head 32 and the valve seat 24, formed complementary to each other, can be bevelled at any seat angle Av, to the axes of valve head 32 and inlet port 20, respectively, as desired, but less than 90°, that is, as an acute angle.

Now, in accordance with the invention, the valve stem 42 of the poppet valve 30 is skewed at an acute angle As relative to the axis 36 of the head of this valve. In conventional poppet valves, the stem extends concentrically from the head of such a valve and thus coaxial thereto.

As shown in FIG. 1, the stem 42 is reciprocably journalled in a suitable stem guide 44 in the cylinder head 16 with one end of the stem 42 extending outward from the cylinder head for actuation in one direction axially, by means of, for example, a rocker arm 46 engaging the free end of this stem. Axial movement of the stem 42 and therefore the poppet valve 30 in the opposite direction is effected by means of a coiled spring 48 encircling the stem 42 with one end of the spring abutting against the cylinder head 16 and its other end engaging a valve spring retainer cap 50 suitably locked adjacent to the free end of this stem, in a known manner.

Although the stem 42, which can be considered a skewed valve stem, may extend directly from the valve head 32, in the embodiment disclosed, a stub stem 52 is interposed between the valve head 32 and the stem 42, this stub stem 52 being concentric with the valve head 32 and coaxial with respect to the axis 36 of valve head 32.

The skewed angle As of the valve stem 42 relative to the head 32 can be equal to, but preferably less than, the seat angle Av of the valve seat 24, which as previously described, corresponds to the bevelled angle, which is an acute angle, of the seating surface 34 of the valve head 32, to thereby permit sliding engagement and disengagement of the seating surface 34 of the valve head 32 relative to the valve seat 24 during seating and unseating of the valve head 32.

Again with reference to FIG. 1, it can be seen that the valve head 32 of poppet valve 30, as shown in solid line, would, when seated, block flow from the induction passage through the inlet port 20 to the combustion chamber of the engine in a conventional manner. However, with the valve stem skewed relative to the axis of the valve head, during unseating of this valve, as the valve stem is moved in an axial direction to effect unseating of the valve head, the valve head 32 will move with both vertical and horizontal components of motion relative to the axis of the inlet port, that is, in a direction both downward and sideways relative to the inlet port 20, to an open position relative thereto, as shown in broken lines in FIG. 1.

With reference to FIG. 1, it will be seen that when the head 32 is in its open position relative to the inlet port 20, an increased sized flow area will be provided on one side of the inlet port, on the right-hand side as seen in this figure, which is the side opposite from the sideways direction of opening movement of the valve head. A reduced flow area will be provided on the opposite side of the valve, the left-hand side as seen in this figure.

Thus, when the valve 30 is open, with the valve head 32 then moved downward vertically and horizontally, with respect to the inlet port 20, to provide more flow area on one side of the valve head relative to the inlet port than on the other side, substantially more induction fluid will flow through the larger flow area, with its relatively low flow coefficient, than through the reduced flow area into the combustion chamber. These unbalanced flow paths on opposite sides of the valve head, which is also positioned radially outward from the longitudinal axis of the bore 12, will cause the induction fluid entering the combustion chamber to flow therein with a swirling motion.

As best seen in FIG. 2, the larger volume of induction fluid entering the combustion chamber through the enlarged flow area will strike the inner periphery of bore 12 to flow at first in a somewhat circular path around the axis of this bore in a downward and counterclockwise direction, with reference to this figure, while the smaller amount of induction fluid entering from the opposite side will at first flow in a slightly downward and in a clockwise direction, these flow paths then mixing into each other to effect whirling flow of the induction fluid throughout the combustion chamber. Of course, the amount of swirl will depend on the location of each inlet port 20 and valve head relative to the inner peripheral wall of the cylinder bore 12 and on the direction of opening of the valve head relative to the portion of the peripheral wall of bore 12 closely adjacent to the valve head. In addition, in order to maximize the flow coefficient of the valve-port combination, as described above, it is desirable to locate the maximum flow area section on the outside bend of the inlet port 20, as shown in FIG. 1, that is, on the outside bend 18a side of induction passage 18.

Although the poppet valve 30 has been illustrated and described as being an intake valve, it is to be realized that such a skewed stem valve could also be used as an exhaust valve having an improved flow coefficient over conventional poppet type exhaust valves.

What is claimed is:

1. An intake port for an internal combustion engine including a cylinder head having an induction passage therein terminating at an annular bevelled valve seat defining an inlet port to a combustion chamber, said valve seat being bevelled at a predetermined acute angle relative to the axis of said inlet port, a through stem guide bore in said cylinder head, the axis of said stem guide bore being inclined at an angle to said axis of said inlet port no greater than the bevel angle of said valve seat, an induction valve having a valve stem and a valve head, said valve head being constituted as a body of revolution about an axis, said valve stem being skewed at an angle no greater than the bevel angle of said valve seat relative to the axis of said valve head and being slidably journalled in said stem guide bore, said valve head having an annular bevelled seating portion of a shape complementary to said valve seat adapted to seat against said valve seat when said valve head is in a closed position relative to said inlet port.

2. An intake port for an internal combustion engine according to claim 1 wherein said induction passage is curved along its longitudinal length with one wall portion of said induction passage having an inside bend and another portion defining an outside bend whereby to change the direction of induction fluid flow at least adjacent to said inlet port and, wherein said stem guide bore extends from said outside bend through said cylinder head.

3. In combination with an internal combustion engine of the type having a cylinder block with a cylinder bore therein, a cylinder head partly closing the end of said cylinder block to define with said bore therein a combustion chamber, an induction passage in said cylinder head to deliver induction fluid to the combustion chamber; an intake valve means carried by said cylinder head and operable to control the intake of combustion fluid into said combustion chamber, said inlet valve means comprising means in said cylinder head defining a circular inlet port opening through a wall of said cylinder head connecting said combustion chamber with said induction passage, said inlet port being defined in part by an annular bevelled valve seat in said cylinder head on the combustion chamber side thereof, a poppet valve member having a head portion constituted as a body of revolution about an axis with an annular bevelled valve seat engageable with said valve seat and, a stem portion extending from said head portion with the axis of said stem portion being inclined at an acute angle to the axis of said head portion corresponding to the bevel angle of said valve seat, said cylinder head having a stem guide bore therethrough inclined at the same angle as said stem to the axis of said valve head.

4. A reciprocating type poppet valve comprising a valve head constituted as a body of revolution about an axis with its opposite end surfaces defining a valve face and a valve back, said valve head having an annular bevelled seating portion around the peripheral rim thereof adjacent to said valve back, and a valve stem rigidly fixed to said valve head and extending from said valve back at an acute angle relative to the axis of said valve head, said angle being no greater than the bevel angle of said seating portion, said valve stem having a straight cylindrical portion of substantial length extending from its free end whereby said valve stem is adapted to be reciprocably journalled in a stem guide bore in the cylinder head of an engine.

* * * * *